United States Patent
Zhu et al.

(10) Patent No.: US 11,279,794 B2
(45) Date of Patent: Mar. 22, 2022

(54) ARAMID-BASED EPOXY RESIN AND PREPARATION METHOD THEREOF

(71) Applicants: NANJING FORESTRY UNIVERSITY, Jiangsu (CN); ANHUI XINYUAN CHEMICAL CO., LTD, Anhui (CN)

(72) Inventors: Xinbao Zhu, Jiangsu (CN); Min Yu, Jiangsu (CN); Yuting Zhu, Jiangsu (CN); Bingxue Xie, Jiangsu (CN); Yang Yang, Jiangsu (CN); Yang Xi, Jiangsu (CN); Fang Wang, Jiangsu (CN); Dengfeng Guo, Anhui (CN); Zhenshuo Cheng, Anhui (CN); Bo Fu, Jiangsu (CN); Xiaoxiang Zhang, Jiangsu (CN); Yanyi Chen, Jiangsu (CN)

(73) Assignees: NANJING FORESTRY UNIVERSITY, Jiangsu (CN); ANHUI XINYUAN CHEMICAL CO., LTD, Anhui (CN)

( * ) Notice: Subject to any disclaimer, the term of this patent is extended or adjusted under 35 U.S.C. 154(b) by 291 days.

(21) Appl. No.: 16/494,178

(22) PCT Filed: Dec. 10, 2018

(86) PCT No.: PCT/CN2018/120010
§ 371 (c)(1),
(2) Date: Sep. 13, 2019

(87) PCT Pub. No.: WO2019/114643
PCT Pub. Date: Jun. 20, 2019

(65) Prior Publication Data
US 2020/0131303 A1    Apr. 30, 2020

(30) Foreign Application Priority Data

Dec. 15, 2017 (CN) .......................... 201711354416.3

(51) Int. Cl.
C08G 59/04 (2006.01)
D06M 15/55 (2006.01)
D06M 101/36 (2006.01)

(52) U.S. Cl.
CPC ............. *C08G 59/04* (2013.01); *D06M 15/55* (2013.01); *D06M 2101/36* (2013.01)

(58) Field of Classification Search
CPC ..................................................... C08G 59/04
See application file for complete search history.

(56) References Cited

FOREIGN PATENT DOCUMENTS

| CN | 101538398 A | 9/2009 |
|---|---|---|
| CN | 101831800 A | 9/2010 |

(Continued)

OTHER PUBLICATIONS

Wu, J., and X. H. Cheng. "The effect of surface treatment of F-12 aramid fibers with rare earths on the interlaminar shear strength of aramid/epoxy composites." Mechanics of Composite Materials 41.2 (2005): 181-186. (Year: 2005).*

(Continued)

*Primary Examiner* — Megan McCulley
(74) *Attorney, Agent, or Firm* — Berenato & White, LLC

(57) ABSTRACT

The present invention discloses an aramid-based epoxy resin and a method of making same, including the steps of reacting aramid fiber powder as a raw material with a metallization reagent; grafting a plurality of ethylene oxide, propylene oxide or a mixture thereof to an activated amide group of the aramid to introduce a reactive functional group hydroxyl; and then conducting a ring-opening and closing reaction by using epichlorohydrin to obtain a liquid aramid-based epoxy resin.

20 Claims, 1 Drawing Sheet

(56) References Cited

FOREIGN PATENT DOCUMENTS

| | | | |
|---|---|---|---|
| CN | 103469589 | A | 12/2013 |
| CN | 103938454 | A | 7/2014 |
| CN | 108047429 | A | 5/2018 |
| DE | 68912367 | T2 | 9/1994 |
| EP | 0332919 | B1 | 1/1994 |
| JP | S6335630 | A | 2/1988 |
| KR | 940007753 | B1 | 8/1994 |

OTHER PUBLICATIONS

Long. Jun et al., "Non-official translation: Effect of Graft Modification on Mechanical Properties of F-12 Fiber and Its Epoxy Composites", Materials Science and Technology, Sep. 1999, vol. 07, No. 3; pp. 46-48; English language Abstract.

\* cited by examiner

ARAMID-BASED EPOXY RESIN AND PREPARATION METHOD THEREOF

CROSS-REFERENCE TO RELATED APPLICATIONS AND CLAIM TO PRIORITY

This application is a national stage application of International Application No. PCT/CN2018/120010 filed Dec. 10, 2018, which claims priority to Chinese Patent Application No. CN201711354416.3, filed with the Chinese Patent Office on Dec. 15, 2017 and entitled "ARAMID-BASED EPDXY RESIN AND PREPARATION METHOD THEREOF", which is incorporated herein by reference in its entirety.

TECHNICAL FIELD

The present invention relates to the technical field of graft modification of aramid powder and a low-molecular-weight defective aramid powder product that is produced in an aramid production process and relates to an aramid-based epoxy resin and a preparation method thereof.

BACKGROUND

An aramid fiber is a new type of high-tech synthetic fiber composed of an aromatic ring and an amide bond, and has advantages such as high strength, high modulus, high temperature resistance, and low density. However, due to a large benzene ring structure in a molecular chain of the aramid fiber, it is relatively difficult for an amide group to react with another group, and due to a smooth surface of aramid and chemical inertness of the aramid, surface activity of the fiber is low and wettability is poor, and consequently there is relatively low interface bonding strength between the fiber and a resin matrix.

Aramid has a very broad application prospect in various fields, and its related research and development have become a recognized hot spot and frontier in this field. However, it is learned from in-depth physical and chemical analysis of the aramid fiber that, due to its structural features, there are the following application difficulties in an aramid material to some extent:

(1) Aramid is a macromolecular polymer, and its structure includes many benzene rings, and therefore a chain has higher rigidity and poor flexibility is poor and cannot be easily mover, and it is very difficult to freely rotate a chain segment.

(2) A molecular chain at a surface layer of an aramid fiber has high symmetry, a high orientation degree, and high crystallinity, but a core layer changes little, and therefore strength of a surface layer is higher than that of a core layer in an obtained aramid fiber. In addition, it is relatively difficult to form a hydrogen bond between molecular chains of the aramid fiber, and radial intermolecular force of the fiber is also relatively small, ultimately leading to a relatively low binding effect. To some extent, it is determined that aramid has an obvious "skin-core" structure, and there is also a distinct gradient intensity distribution on a corresponding cross section. These structural characteristics directly affect later aramid research and application. For example, as a reinforcing material, aramid is a main carrier in a composite material, and can increase strength, while a specific result of impact of the structure on the aramid is as follows: Once a surface structure of a fiber is destroyed by the outside, the fiber strength is greatly reduced, thereby correspondingly losing a reinforcement effect.

(3) There are many benzene ring groups and carbonyl groups in a chain structure of aramid, a "conjugation effect" and "steric hindrance" between the benzene ring groups and the carbonyl groups are very strong, leading to a decrease in reaction activity of H of an amide group in a molecular chain of the aramid. As a result, there are almost no chemically active groups on a surface of an aramid fiber material; in addition, the surface of the fiber is very smooth, and surface energy of the aramid fiber material is extremely low. Consequently, interface bonding strength of the composite material is relatively low, and mechanical property is reduced.

Therefore, it is necessary to perform surface modification on aramid, to improve application performance of the aramid. Surface modification of an aramid fiber may be generally divided into physical modification, chemical modification, and synergistic modification. Surface chemical graft modification is a most studied method at present. Chemical modification may be divided into two parts: one part is conducted on a benzene ring, and the other part is replacing a hydrogen atom of an amide group.

In a grafting reaction conducted on a benzene ring, based on that an ortho-position and a para-position of the benzene ring in an aramid fiber material have reaction activity, a polar group with reaction activity may be introduced into a surface of the aramid fiber. This can increase surface polarity of the aramid fiber and facilitate forming of chemical bonding between the aramid fiber and a resin matrix, thereby further improving interface bonding strength of a composite material. According to conventional chemical empirical research on a grafting reaction on a benzene ring, there are generally the following two manners:

(1) A nitration reduction reaction is conducted to introduce an amido group. In this method, a nitration reduction reaction is first conducted to introduce a nitro group to a benzene ring, and then under a specific condition, a reducing agent is used to restore the introduced group nitro to an amido group. In this case, a polar group is introduced into a fiber surface, so that wettability of a resin matrix to the fiber surface is more sufficient and more uniform, thereby further improving interface bonding performance of a composite material.

(2) Chlorosulfonation is conducted to introduce an active group. With chlorosulfonation, not only an acyl chloride group ($-SO_2Cl$) is introduced to a surface of an aramid fiber, but also another group with polarity is grafted onto the surface of the aramid fiber, to increase surface polarity of the fiber.

A reaction that occurs on a benzene ring is relatively effective in some respects. However, there are problems in both methods, such as it is difficult to control a reaction degree and strength of the fiber body is easily damaged.

It is not easy to conduct a substitution reaction of hydrogen of an amide group in an aramid fiber material. This is mainly because that there is a conjugated system structure between an amide bond and a benzene ring, a to-be-replaced hydrogen is shielded due to strong steric hindrance, so that reaction activity of hydrogen of the amide group is very poor and the to-be-replaced hydrogen is not easily replaced. Even if the substitution reaction can be conducted, types and a number of reactive functional groups are also very limited.

Currently, aramid modification research mainly focuses on surface modification of aramid for reinforcement of composite materials, to improve performance of aramid-based composite materials. However, study on development of new aramid-based composite material monomers by using aramid as a raw material is rarely reported.

SUMMARY

Invention objective: In view of deficiency in the prior art, an object of the present invention is to provide an aramid-based epoxy resin, where a salable aramid product and a defective low-molecular-weight aramid powder product that is produced in a production process of the salable aramid product are used as raw materials to be activated by a metallization reagent to prepare liquid aramid-based polyether, and then the liquid aramid polyether reacts with epoxy chloropropane to prepare the aramid-based epoxy resin. In the present invention, the process is simple, the final product has excellent performance, and the like. Another object of the present invention is to provide a preparation method of the aramid-based epoxy resin.

To achieve the above purpose, the present invention provides the following technical solution.

In a first aspect, the present invention provides a preparation method of an aramid-based epoxy resin, including: first allowing aramid powder as a raw material to react with a metallization reagent; grafting a plurality of ethylene oxide (EO) or propylene oxide (PO) or a mixture thereof to an activated amide group of the aramid, to introduce a reactive functional group hydroxyl; and conducting a ring-opening and closure reaction by using epoxy chloropropane (ECH), to obtain a liquid aramid-based epoxy resin.

The aramid powder includes para-aramid or a low-molecular-weight defective aramid powder product that is produced in a production process of the para-aramid.

In the preparation method of an aramid-based epoxy resin, a substitution reaction of H of an amide group of the aramid is first conducted, the metallization reagent is prepared by using an alkali metal or an alkali metal compound and a solvent, and the prepared metallization reagent is used for substitution of H of the amide group of the para-aramid to form metalized aramid; a ring-opening polymerization reaction is conducted between the metalized aramid and the EO, the PO, or a mixture thereof to prepare hydroxyalkyl aramid, and a ring-opening and closure reaction is conducted between the hydroxyalkyl aramid and ECH; and reduced pressure distillation is conducted to recycle the solvent, a crude product is dissolved by methylene chloride and washed with a moderate amount of water, and distillation is conducted to recycle the solvent dichloromethane, so that the liquid aramid-based epoxy resin is prepared.

In preparation of the metallization reagent, the solvent is DMSO or DMF, and a dosage of the solvent is 40 mL to 70 mL/g of the aramid powder.

In preparation of the metallization reagent, the alkali metal includes sodium and potassium, the alkali metal compound includes sodium methoxide, sodium hydroxide, potassium methoxide, and potassium hydroxide, and a dosage of the alkali metal or the alkali metal compound is 0.15% to 0.40% of total mass of reactants.

In the preparation method of an aramid-based epoxy resin, the genus reagent reacts with H of the para-aramid amide group to form a metallated aramid, and then undergoes a hydroxyalkylation reaction with the EO or PO, where m(aramid):m(EO or PO)=1:(1.5-4.5), the reaction temperature is 100° C. to 130° C., an EO or PO feeding time is 1.5 h to 3.5 h, and heat insulation for reaction is conducted for 1 h, to obtain crude hydroxyalkylated aramid.

In the preparation method of an aramid-based epoxy resin, epichlorohydrin is slowly dropwise added to the crude hydroxyalkylated aramid, where m(aramid):m(ECH)=1:(1.5-2.5), a time for dropwise adding the ECH is 2 h to 6 h, heat insulation for reaction is conducted for 1 h, and the reaction temperature is 40° C. to 80° C., preferably 40~60° C. After the reaction is completed, the solvent was distilled off under reduced pressure, the crude product is dissolved in dichloromethane, washed three times with an appropriate amount of water, and subject to distillation for recycling dichloromethane, to obtain an aramid-based epoxy resin.

In a second aspect, the present invention provides an aramid-based epoxy resin obtained by using the above preparation method of an aramid-based epoxy resin.

Beneficial effects: Compared with the prior art, in the method of the present invention for preparing the aramid-based epoxy resin by using a defective aramid product, a raw material para-aramid may be a salable aramid product or low-molecular-weight defective aramid powder product; compared with sodium hydride, sodium metal, sodium hydroxide, and sodium methoxide used as metallization reagents of the aramid powder have advantages of convenient use and less hydrogen production; an alkali metal compound obtained after a hydroxyalkylation reaction is conducted can be directly used as a raw material for an ECH epoxidation reaction, and the epoxy resin has a simple preparation process and has a high epoxy value; and the aramid-based epoxy resin has low viscosity and high reactivity, and when a small amount of the aramid-based epoxy resin is added into E-51, tensile performance, impact resistance performance, bending strength, and the like of a cured product are greatly improved.

DETAILED DESCRIPTION

Figure 1:
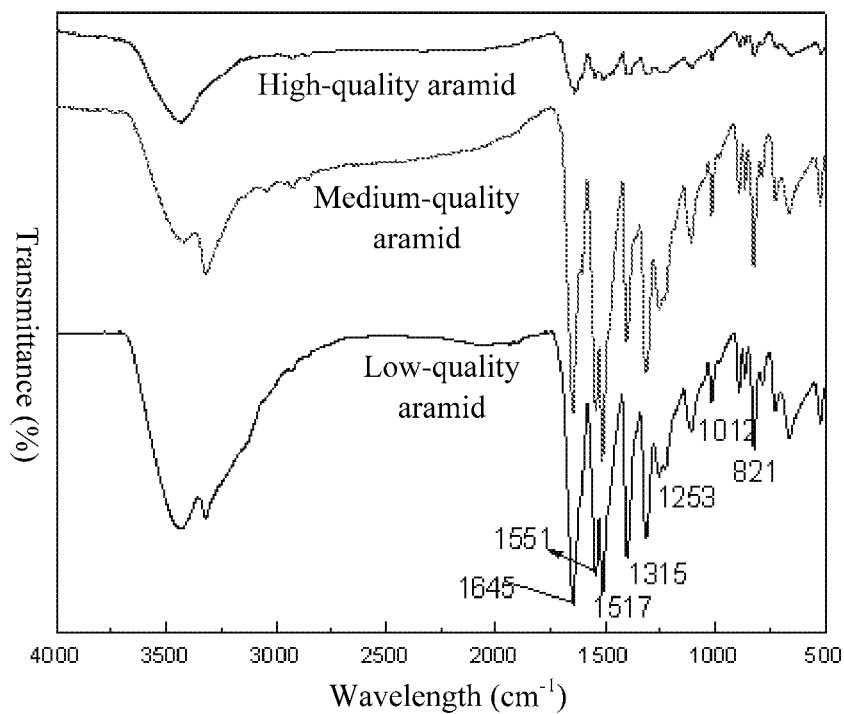
FIG. 1 is an infrared spectrogram of recycled refined aramid powder.

The present invention will be described in detail below with reference to specific embodiments.

In the embodiments, a raw material ethylene oxide is an industrial grade reagent and is purchased from Sinopec Yangzi Petrochemical Co., Ltd; epoxypropane and epoxy chloropropane are industrial grade reagents and are purchased from Qilu Petrochemical Industry Co., Ltd; metal sodium, sodium hydroxide, dimethyl sulfoxide, and dimethyl formamide are analytical pure reagents and are purchased from Nanjing Chemical Reagent Co., Ltd; high purity nitrogen has purity of 99.9% and is purchased from Nanjing Special Gas Factory Co., Ltd; and aramid powder is purchased from Sinopec Oilfield Service Corporation. An epoxy value of aramid-based epoxy resin is determined according to GB/T 1677-2008.

Embodiment 1

300 mL of dimethyl sulfoxide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 15.5 g of ethylene oxide is introduced, and the reaction temperature is controlled to be 110° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 30° C. under the protection of nitrogen gas, 10.5 g of epoxy chloropropane is lowly added dropwise for 1 h and is slowly heated to 50° C., reaction is conducted for 4.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.57 eq/100 g.

Embodiment 2

300 mL of dimethyl sulfoxide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 10.3 g of ethylene oxide is introduced, and the reaction temperature is controlled to be 120° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 40° C. under the protection of nitrogen gas, 10.5 g of epoxy chloropropane is lowly added dropwise for 1 h and is slowly heated to 60° C., reaction is conducted for 4.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.42 eq/100 g.

Embodiment 3

300 mL of dimethyl sulfoxide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 20.6 g of ethylene oxide is introduced, and the reaction temperature is controlled to be 130° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 50° C. under the protection of nitrogen gas, 10.5 g of epoxy chloropropane is lowly added dropwise for 1 h and is slowly heated to 50° C., reaction is conducted for 4 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.11 eq/100 g.

Embodiment 4

300 mL of dimethyl formamide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 25.8 g of ethylene oxide is introduced, and the reaction temperature is controlled to be 130° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 40° C. under the protection of nitrogen gas, 10.5 g of epoxy chloropropane is lowly added dropwise for 1 h and is slowly heated to 50° C., reaction is conducted for 3.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.02 eq/100 g.

Embodiment 5

330 mL of dimethyl sulfoxide is added to a 1000 mL four-necked flask equipped with a stirrer, a condenser tube, and a thermometer, 1.9 g of metal sodium is added under the protection of nitrogen gas and heated to 70° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 15.0 g of ethylene oxide is introduced, and the reaction temperature is controlled to be 110° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 50° C. under the protection of nitrogen gas, 10.5 g of epoxy chloropropane is lowly added dropwise for 1 h, reaction is conducted for 3.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.35 eq/100 g.

Embodiment 6

300 mL of dimethyl sulfoxide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 15.0 g of ethylene oxide is introduced, and the reaction temperature is controlled to be 110° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 30° C. under the protection of nitrogen gas, 12.0 g of epoxy chloropropane is lowly added dropwise for 1 h and is slowly heated to 50° C., reaction is conducted for 4.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.32 eq/100 g.

Embodiment 7

300 mL of dimethyl formamide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring is conducted for heating, 15.0 g of ethylene oxide is introduced, and the reaction temperature is controlled to be 110° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 30° C. under the protection of nitrogen gas, 12.0 g of epoxy chloropropane is lowly added dropwise for 1 h and is slowly heated to 50° C., reaction is conducted for 4.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.23 eq/100 g.

Embodiment 8

300 mL of dimethyl sulfoxide is added to a 1000 mL four-necked flask equipped with a stirrer, a condenser tube, and a thermometer, 1.4 g of metal sodium is added under the protection of nitrogen gas and heated to 80° C., and stirring is conducted to dissolve Na, so that the solution changes to a dark brown red metallization reagent; in an atmosphere of nitrogen gas, the metallization reagent is added to a 1000 mL autoclave, 6 g of defective aramid powder product is added, air is displaced by nitrogen gas, stirring and heating are conducted, 19.7 g of ethylene oxide is introduced, and the reaction temperature is controlled to be 110° C., reaction pressure is controlled to be lower than 0.8 MPa, and a grafting reaction time is controlled to be 2.5 h to prepare a hydroxyalkylated aramid crude product; and the hydroxyalkylated aramid is added to a four-necked flask equipped with a reflux condenser tube, a thermometer, and a constant-pressure dropping funnel and heated to 30° C. under the protection of nitrogen gas, 10.5 g of epoxy chloropropane is lowly added dropwise for 1 h and is slowly heated to 50° C., reaction is conducted for 4.5 h, reduced pressure distillation is conducted after the reaction to recycle dimethyl sulfoxide, and a crude product is dissolved in methylene chloride, washed with a moderate amount of water three times, and subject to distillation for recycling the solvent methylene chloride, to obtain a black liquid with an epoxy value of 1.43 eq/100 g.

Embodiment 9

The aramid-based epoxy resin prepared in Embodiment 1, a bisphenol A-type epoxy resin (E-51), and a curing agent diethylenetriamine are uniformly mixed at room temperature, poured into a mold, placed in a vacuum drying oven for vacuum degassing for 15 min, and then cured in a drying oven at 80° C. for 2 h. A total of three parallel sample stripes are prepared and test data is averaged to obtain results listed in Table 1.

TABLE 1

Product performance test table

| | Comparison sample | Product 1 | Product 2 |
|---|---|---|---|
| Product in Embodiment 1 | 0 g | 2.5 g | 5 g |
| E-51 | 100 g | 97.5 g | 95 g |
| Diethylenetriamine | 28 g | 28 g | 28 g |
| Tensile strength | 31.55 MPa | 60.08 MPa | 68.94 MPa |
| Elongation at break | 1.65% | 3.11% | 3.96% |
| Shock strength | 5.42 kJ/m$^2$ | 7.96 kJ/m$^2$ | 11.25 kJ/m$^2$ |
| Bending strength | 107.08 MPa | 109.04 MPa | 128.25 MPa |

It can be learned from the results in Table 1 that when a small amount of the prepared aramid-based epoxy resin is added into E-51, a tensile property, impact resistance, bending strength, and the like of the cured product are greatly improved.

Embodiment 10

In the foregoing embodiments, a raw material aramid powder recovery and refining process is as follows: N-methyl pyrrolidone-containing aramid powder discharged during a production process is collected; the crude aramid powder product and water are stirred in a beaker at a mass ratio of 1:2 for 1 h, and is subjected to suction filtration; and a filter cake is washed with water several times according to a mass ratio of 1:3 until filter liquor is neutral. Finally, the filter cake is poured into a clean evaporating dish and placed in a drying oven to be dried to a constant weight. The dried aramid powder is ground, sieved through a 40 mesh sieve, and loaded in a seal bag, that is, aramid powder is obtained.

0.125 g of recycled refined aramid powder dried to a constant weight is dissolved in 25 mL of 98% concentrated sulfuric acid. Viscosity of the aramid powder is measured in an Ubbelohde viscometer in a constant temperature bath at $(30\pm0.05)°$ C., and a molecular weight of the aramid powder is calculated according to the viscosity, and results are listed in Table 2.

TABLE 2

[η], $M_\eta$, and $DP_\eta$ of the recycled stood aramid powder

| Aramid | [η]/(dL/g) | $M_\eta$ | $DP_\eta$ |
|---|---|---|---|
| Low-quality aramid | 0.33 | 2606 | 11 |
| Medium-quality aramid | 0.37 | 2903 | 12 |
| High-quality aramid | 0.69 | 5226 | 22 |

Viscosity-average molecular weights of low-quality, medium-quality, and high-quality aramid measured by using the Ubbelohde viscometer are respectively 2606, 2903, and 5226, and polymerization degrees thereof are respectively 11, 12, and 22. It indicates that structural properties of low-quality and medium-quality aramid are similar, and high-quality aramid has a large molecular weight, high crystallinity, and a better mechanical property.

Figure 2:
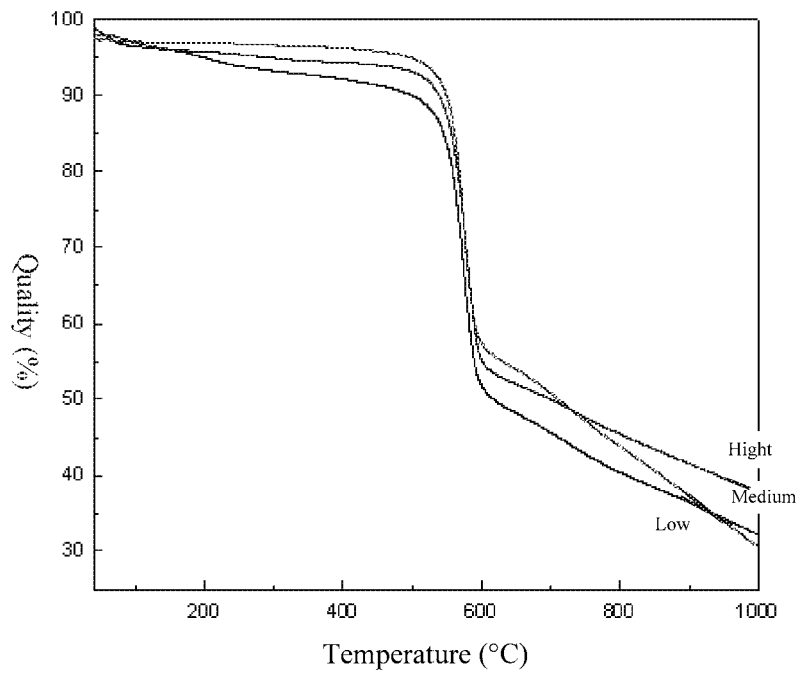
FIG. 2 is a thermogravimetric chart of recycled refined aramid powder.

The recycled refined aramid powder is measured to obtain an infrared spectrogram, and a result is shown in FIG. 1. TG analysis is conducted on the recycled refined aramid powder, and a result is shown in FIG. 2. According to infrared analysis and thermogravimetric analysis, the low-quality, medium-quality, and high-quality aramid have similar infrared spectrograms and relatively good heat resistance, and are degraded less within 500° C. When mass losses are 50%, temperature of the low-quality, medium-quality, and high-quality aramid are 498° C., 540° C., and 550° C., respectively. This indicates that a higher molecular weight of aramid indicates better heat resistance.

What is claimed is:

1. A preparation method of an aramid-based epoxy resin, wherein the method comprises:
   first allowing aramid powder as a raw material to react with a metallization reagent;
   second grafting a plurality of ethylene oxide or propylene oxide or a mixture thereof to an activated amide group of the aramid, to introduce a reactive functional group hydroxyl; and
   third conducting a ring-opening and closure reaction by using epoxy chloropropane, to obtain a liquid aramid-based epoxy resin.

2. The preparation method of an aramid-based epoxy resin according to claim 1, wherein the aramid powder comprises para-aramid or an aramid powder product that is defective because of a low molecular weight, and that is produced in a production process of the para-aramid.

3. An aramid-based epoxy resin obtained by using the preparation method of an aramid-based epoxy resin according to claim 2.

4. The preparation method of an aramid-based epoxy resin according to claim 1, wherein a substitution reaction of H of an amide group of the aramid is first conducted, the metallization reagent is prepared by using an alkali metal or an alkali metal compound and a solvent, and the prepared metallization reagent is used for substitution of H of the amide group of the aramid to form metalized aramid; a ring-opening polymerization reaction is conducted between the metalized aramid and ethylene oxide, propylene oxide, or a mixture thereof to prepare hydroxyalkyl aramid, and a ring-opening and closure reaction is conducted between the hydroxyalkyl aramid and epoxy chloropropane; and reduced pressure distillation is conducted to recycle the solvent, a crude product is dissolved by dichloromethane and washed with a moderate amount of water, and distillation is conducted to recycle dichloromethane, so that the liquid aramid-based epoxy resin is prepared.

5. The preparation method of an aramid-based epoxy resin according to claim 4, wherein in preparation of the metallization reagent, the solvent is dimethyl sulfoxide or N,N-dimethylformamide, and a dosage of the solvent is 40 mL to 70 mL/g of the aramid powder.

6. An aramid-based epoxy resin obtained by using the preparation method of an aramid-based epoxy resin according to claim 5.

7. The preparation method of an aramid-based epoxy resin according to claim 4, wherein in preparation of the metallization reagent, the alkali metal comprises sodium or potassium, the alkali metal compound comprises sodium methoxide, sodium hydroxide, potassium methoxide, or potassium hydroxide, and a dosage of the alkali metal or the alkali metal compound is 0.15% to 0.40% of total mass of reactants.

8. The preparation method of an aramid-based epoxy resin according to claim 7, wherein the dosage of the alkali metal or the alkali metal compound is 0.15% to 0.25% of the total mass of the reactants.

9. An aramid-based epoxy resin obtained by using the preparation method of an aramid-based epoxy resin according to claim 8.

10. An aramid-based epoxy resin obtained by using the preparation method of an aramid-based epoxy resin according to claim 7.

11. The preparation method of an aramid-based epoxy resin according to claim 4, wherein a mass ratio of the aramid to the ethylene oxide, propylene oxide or a mixture thereof is in the range of 1:(1.5-4.5) respectively, a temperature for the ring-opening polymerization reaction is in the range of 100° C. to 130° C., a feeding time for ethylene oxide, propylene oxide, or a mixture thereof is 1.5 h to 3.5 h, and heat insulation for reaction is conducted for 1 h.

12. The preparation method of an aramid-based epoxy resin according to claim 11, wherein a mass ratio of the aramid to the epoxy chloropropane is in the range of 1:(1.5-2.5), a time for dropwise adding the epoxy chloropropane is 2 h to 6 h, heat insulation for reaction is conducted for 1 h, and a temperature for the ring-opening and closure reaction is in the range of 40° C. to 80° C.

13. The preparation method of an aramid-based epoxy resin according to claim 12, wherein the temperature for the ring-opening and closure reaction is in the range of 40° C. to 60° C.

14. An aramid-based epoxy resin obtained by using the preparation method of an aramid-based epoxy resin according to claim 11.

15. The preparation method of an aramid-based epoxy resin according to claim 4, wherein a mass ratio of the aramid to the epoxy chloropropane is in the range of 1:(1.5-2.5), a time for dropwise adding the epoxy chloropropane is 2 h to 6 h, heat insulation for reaction is conducted for 1 h, and the reaction a temperature for the ring-opening and closure reaction is in the range of 40° C. to 80° C.

16. The preparation method of an aramid-based epoxy resin according to claim 15, wherein the temperature for the ring-opening and closure reaction is in the range of 40° C. to 60° C.

17. An aramid-based epoxy resin obtained by using the preparation method of an aramid-based epoxy resin according to claim 16.

18. An aramid-based epoxy resin obtained by using the preparation method of an aramid-based epoxy resin according to claim 15.

19. An aramid-based epoxy resin obtained by using the preparation method of an aramid-based epoxy resin according to claim 4.

20. An aramid-based epoxy resin obtained by using the preparation method of an aramid-based epoxy resin according to claim 1.

* * * * *